(12) United States Patent
Iversen (10) Patent No.: US 8,707,858 B2
(45) Date of Patent: Apr. 29, 2014

(54) OVEN FOR HEAT-TREATING FOOD PIECES

(75) Inventor: Per Heindorf Iversen, Svendborg (DK)

(73) Assignee: MOM's A/S, Odense C (DK)

( * ) Notice: Subject to any disclaimer, the term of this patent is extended or adjusted under 35 U.S.C. 154(b) by 0 days.

(21) Appl. No.: 13/384,155

(22) PCT Filed: Jul. 12, 2010

(86) PCT No.: PCT/EP2010/059979
§ 371 (c)(1),
(2), (4) Date: Jan. 13, 2012

(87) PCT Pub. No.: WO2011/006868
PCT Pub. Date: Jan. 20, 2011

(65) Prior Publication Data
US 2012/0114822 A1    May 10, 2012

(30) Foreign Application Priority Data

Jul. 17, 2009  (EP) .................................... 09165806

(51) Int. Cl.
*A47J 37/04*    (2006.01)
*A23L 1/217*    (2006.01)

(52) U.S. Cl.
USPC .................. 99/393; 99/391; 99/312; 426/523

(58) Field of Classification Search
USPC .............................. 426/523; 99/393, 391, 312
See application file for complete search history.

(56) References Cited

U.S. PATENT DOCUMENTS

| 1,597,393 | A | * | 8/1926 | Sinden | 198/311 |
|---|---|---|---|---|---|
| 3,615,585 | A | * | 10/1971 | Clemens | 426/465 |
| 3,844,402 | A | * | 10/1974 | Hayashi | 414/416.03 |
| 4,373,431 | A |  | 2/1983 | Wallick et al. | 99/483 |
| 5,006,355 | A | * | 4/1991 | Stuck et al. | 426/243 |
| 5,690,018 | A |  | 11/1997 | Hansen | 99/330 |
| 6,250,207 | B1 |  | 6/2001 | Hansen | 99/286 |

FOREIGN PATENT DOCUMENTS

| AU | 88359/82 | 3/1983 |
|---|---|---|
| EP | 0 557 221 A1 | 8/1993 |
| FR | 2 836 036 A1 | 8/2003 |

OTHER PUBLICATIONS

International Search Report, PCT/EP2010/059979, mailed Aug. 26, 2010.
Notification of Transmittal of the International Preliminary Report on Patentability, PCT/EP2010/059979, mailed Jul. 18, 2011.

* cited by examiner

*Primary Examiner* — Jianying Atkisson
(74) *Attorney, Agent, or Firm* — Winston & Strawn LLP (57) ABSTRACT

An oven serves for heat-treating food pieces laid upon a grid in a cabinet by a heat source. The grid has an upper part of an endless chain running around a number of chain supports of which a lower and upper support defines a lower and upper end of the upper chain part. Portions of food pieces such as French fries can be quickly and easily heat-treated in rapid succession in this oven in a simple and economical manner.

18 Claims, 7 Drawing Sheets

OVEN FOR HEAT-TREATING FOOD PIECES

This application is a 371 filing of International Patent Application PCT/EP2010/059979 filed Jul. 12, 2010.

BACKGROUND

The invention relates to an oven for by means of a heat source heat-treating food pieces placed on a grid in a cabinet.

Ovens for heat treating meals in form of food pieces like for example French fried potatoes is widely utilized in places where there is a demand for getting the meal served easily and quickly.

The publication WO 95/13734 discloses an oven of this kind. This oven comprises a heat-treating chamber with a grid in form of a rotatable drum in which the food pieces are exposed to heat radiation from quartz lamps while simultaneously rotating the drum.

A draw back of this construction is that the temperature in the chamber becomes rather high whereby vaporized substances discharged from the food pieces tend to disintegrate so that malodorous and unhealthy compounds are formed.

Another draw back consists in the fact that such compounds tend to stick to the surface of the hot lamps with the disadvantageous result that the lamps becomes more or less useless and their surface temperature becomes higher than their material can stand.

This known oven also is costly to manufacture. Their complicated structure moreover makes them liable to break down during operation.

Charging the oven with a portion of food pieces requires the following steps.

Opening of a first in-let to the heat-treating chamber and then a second in-let to the drum, charging the drum with food pieces to be heat-treated after which the second in-let opening and the first inlet opening need to be closed again for being able to heat treat the charged food pieces.

The discharging of the finished heat-treated food pieces takes place in the following way.

Turning the drum to a predetermined discharging position, opening a discharge opening by turning a slide gate about the axis of the drum, discharging the heat-treated food pieces through the discharge opening and closing said opening again.

The heat treatment of the food pieces in this known oven also is a relatively slow process owing to the fact that the grid is a drum with a relatively small effective grid area The limited size of the discharge opening and the circular shape of the drum moreover implies that the discharging operation requires time and that emptying of the drum frequently is not complete every time a portion of food pieces has been prepared.

The food pieces are furthermore falling through the discharge opening influenced only by the gravity.

It goes without saying that utilizing of this known oven need to be extremely laborious and time wasting. The oven therefore also is unfit for heat-treating portions of food pieces in rapid succession.

Said known oven for heat-treating portions of food pieces therefore has a relatively small capacity and a large space requirement.

SUMMARY OF THE INVENTION

The present invention now remedies the above-mentioned disadvantages of the prior art by providing an oven that possesses a number of novel and inventive features.

In a first aspect of the present invention providing an oven of the type mentioned in the opening paragraph in which a portion of food pieces quickly and easily can be heat-treated.

In a second aspect of the present invention providing an oven of the type mentioned in the opening paragraph which has a large capacity with a small space requirement.

In a third aspect of the present invention providing an oven of the type mentioned in the opening paragraph by means of which portions of food pieces can be heat-treated in rapid succession.

In a fourth aspect of the present invention providing an oven of the type mentioned in the opening paragraph which can be operated in a simple and economical manner.

In a fifth aspect of the present invention providing an oven of the type mentioned in the opening paragraph which has a simple and inexpensive structure.

In a sixth aspect of the present invention providing an oven of the type mentioned in the opening paragraph which is not liable to break down during operation.

In a seventh aspect of the present invention providing an oven of the type mentioned in the opening paragraph in which the temperature during operation is sufficient low to secure that vaporized substances discharged from the food pieces during the heat treatment is not disintegrated.

In an eight aspect of the present invention providing an oven of the type mentioned in the opening paragraph in which the heat source has a long lifetime.

The novel and unique features of the invention consists in the fact the grid consists of an upper part of an endless chain grate running around a number of chain supports of which a lower and upper support is defining a lower and upper end of said upper chain part.

This oven has, according to the invention, a relatively large chain grate area and moreover a large discharge opening through which a forced discharging of the finished food pieces can take place.

Thereby is advantageously obtained an improved oven by means of which portions of food pieces quickly and easily and in a simple and economical manner can be heat-treated in rapid succession.

The oven also has a simple and inexpensive structure, which is not liable to break down during operation, and also has a long lifetime.

During operation is the temperature in the oven relatively low so that vaporized substances discharged from the food pieces during the heat treatment is not disintegrated.

The oven can, according to the invention, comprise driving means adapted for bringing the upper chain part to run into two opposite directions, namely during heat-treating into the direction of the upper chain support and during discharging into the direction of the lower chain support.

In a preferred embodiment according to the invention can the upper part of the chain form a curve facing the concave side upwards.

The curve is, according to the invention, orientated in such way that the angle of inclination, which the tangent to said curve forms with a horizontal plane, changes from a lower to a higher value into the direction from the lower to the upper chain support, preferable from a value about zero to a value about 90 degrees.

That implies that the upper part of the chain, moving into the direction of the upper chain support, will bring the food pieces along from a lower to a higher level until the angle of inclination has been so large that the food pieces cannot any more remain lying on the chain.

The food pieces then will tumble down from the higher to the lower level on the chain after which they start over again to be moved upwards and this process is repeated until the food pieces has been heat-treated as desired.

The food pieces will, owing to these particular movements of the food pieces on the chain, be turned over a number of times so that an equal heat treatment of all sides of each food piece effectively is secured.

For improving the chains capability to bring the food pieces along can the upper chain part, according to the invention, be equipped with carriers for supporting the upwards-moving food pieces. A larger area of the upper chain part thereby is utilized for the heat-treatment process so that the time used for the process is reduced and the capacity of the oven simultaneously is increased.

Also, the area of the chain grate is relatively large implying the advantage that the time used for heat-treating a portion of food pieces is very short so that the capacity of the oven becomes very large simultaneously with that the oven has a small space requirement.

The capacity of the oven can, according to the invention, easily be so large that the oven is able to prepare relatively large portions of food pieces.

The oven therefore is suitable not only for preparing food pieces for individuals but also as an advantageous apparatus in kitchens of for example restaurants for preparing larger portions of heat-treated food pieces to be served for more customers.

In one embodiment of the invention can the upper part of the chain be forced to follow the above-mentioned curve by means of guide rails placed above the upper chain part, preferable at each side of this chain part.

The guide rails can, according to the invention, moreover be made of a material with a little coefficient of friction in relating to the material of the chain.

In a preferred embodiment of the invention can at least one rotatable disc be placed at each side of the chain grate between the lower and upper roller in such way that the disc is leaning against the top side of the upper chain part whereby a part of the upper chain part is forced to extend along a curve which is following a length of arc of the periphery of the at least one rotatable disc.

The heat-treatment of the food pieces can, according to the invention, take place by means of e.g. a number of quartz lamps placed above the upper chain part in preferable such a position that the food pieces on the chain part is equal irradiated.

The heat-treatment of the food pieces normally requires admission of air to the process for oxidation the food pieces and removing emitted gases.

The oven therefore has at least one inlet for air and at least one outlet for air and emitted gases.

The air and gases in the oven tend to flow upwards, that is from the inlet to the outlet, since they are heated by the heat-treating process in the oven.

In some cases, where such a flow is not enough for being able correctly to heat-treating the food pieces, is utilized an air exhauster for generating a forced flow of air and gasses through the oven from the at least one inlet for air to the at least one outlet for air and emitted gases.

BRIEF DESCRIPTION OF THE DRAWINGS

The invention will be explained in greater details below, giving further advantageous features and technical effects and describing exemplary embodiments with reference to the drawing, in which.

DETAILED DESCRIPTION OF THE INVENTION

It is in the following supposed that the food pieces to be heated-treated are potato pieces like pre-fried French fried potatoes, which during the heat-treating operation is passed by a flow of air for being correctly heat-treated.

Only the oven is shown in the figures but not the food pieces, which is not part of the invention.

Figure 1:
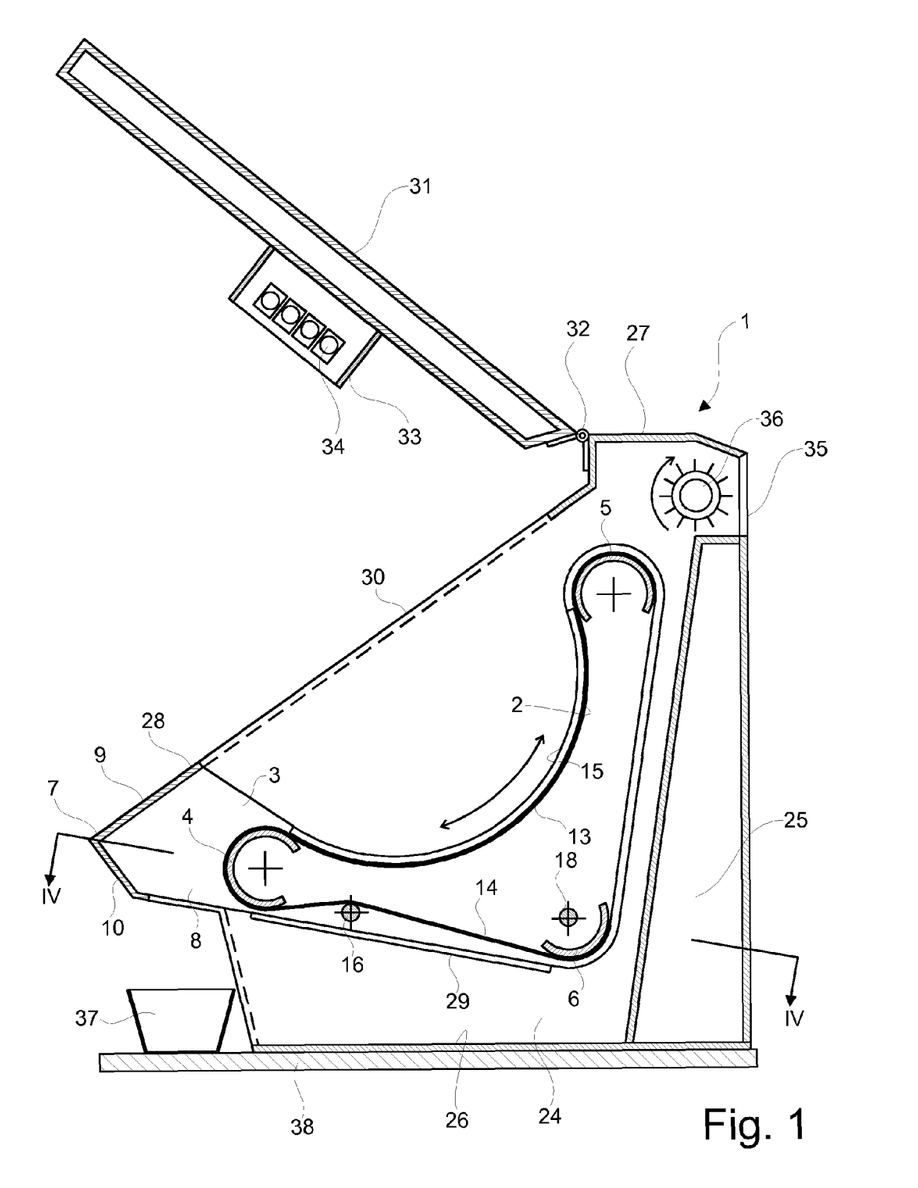
FIG. 1 is a lateral cross-section of one embodiment of the oven according to the invention in an open position.
Figure 2:
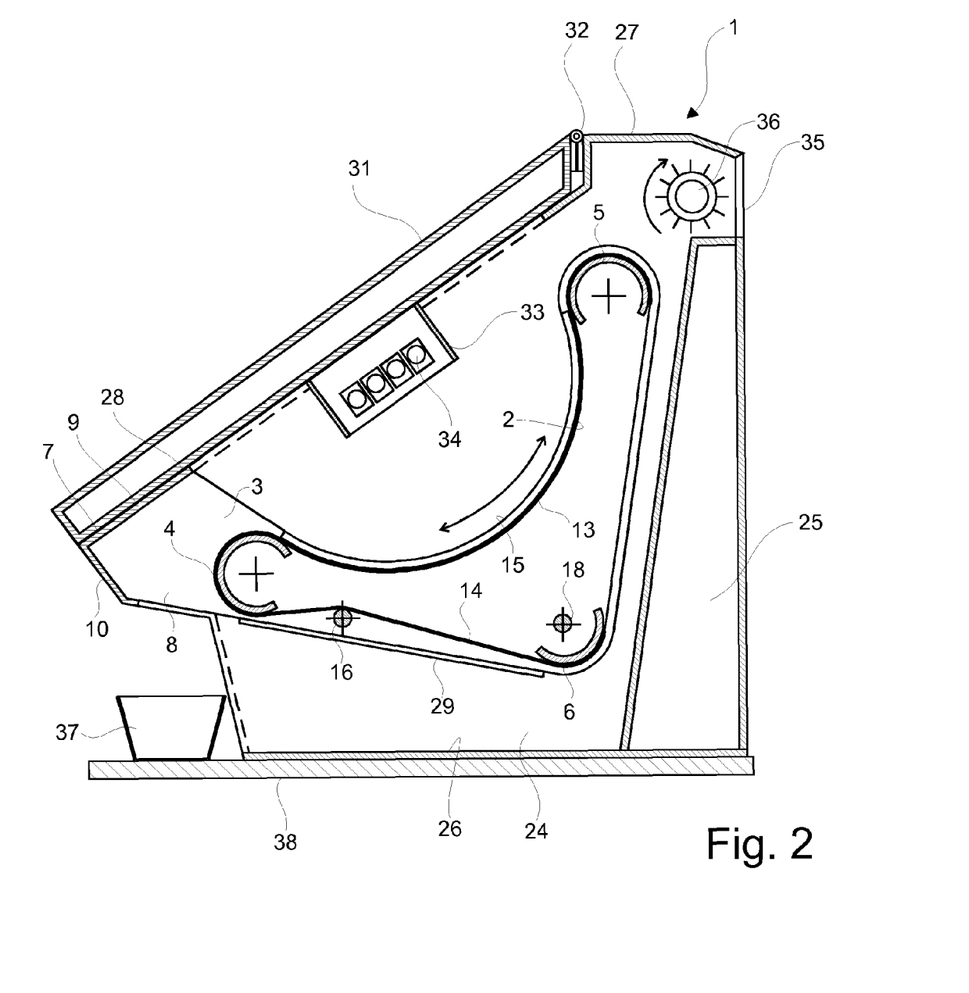
FIG. 2 shows the same but in operative position.
Figure 4:
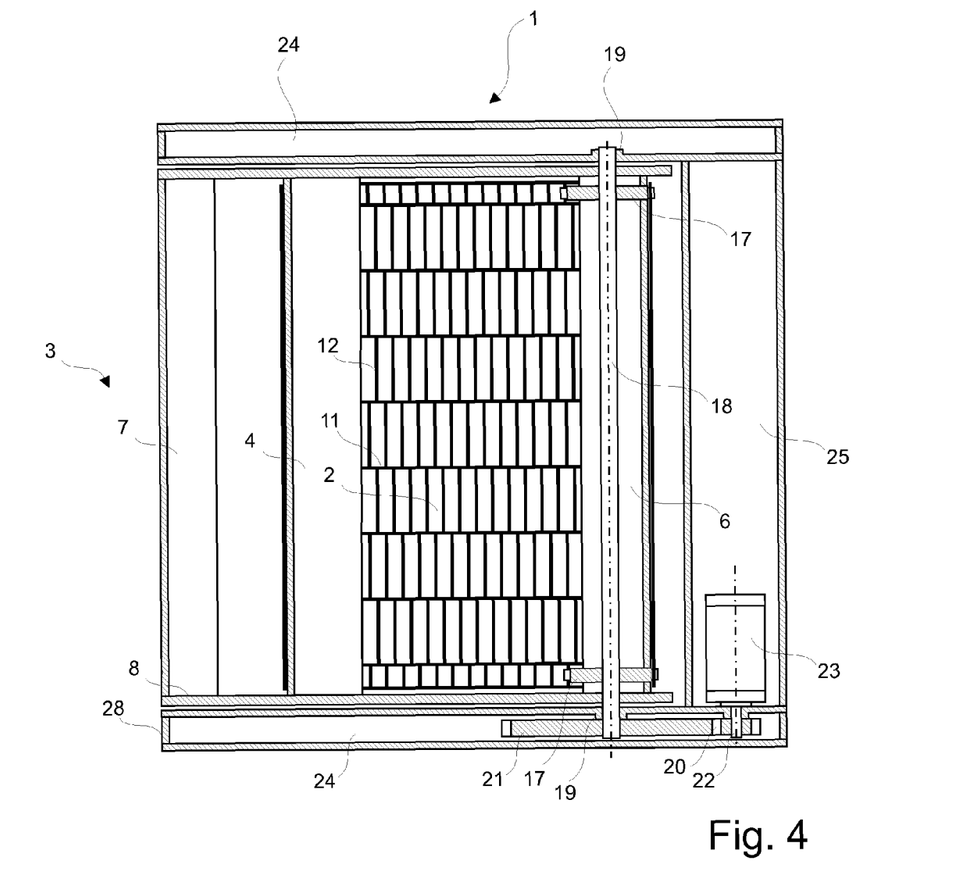
FIG. 4 is a cross-section of the oven taken along the line IV-IV in FIG. 1.

The heat-treating process takes place in the oven shown in FIGS. 1, 2 and 4 comprising a cabinet 1 in which an endless chain grate 2 movable is mounted on a frame 3 consisting in this embodiment of four crossbeams 4, 5, 6 and 7 horizontally extending between two vertical side members 8.

The three crossbeams 4, 5 and 6 are a lower, an upper and an intermediate crossbeam which are functioning as supports for the chain and therefore are formed with curved surfaces for making it easy for the chain to slidingly passing the beams.

The crossbeam 7 is formed as a V with an upper and lower leg 9 and 10.

The chain is, as best seen in FIG. 4, assembled of a number of longitudinal and transversal chain links 11 and 12 articulated to each other so as to form a movable grate. The chain links are in the figures illustrated by means of lines only.

The chain has an upper chain part 13 extending from the lower crossbeam 4 to the upper crossbeam 5 and a lower chain part 14 extending from the upper crossbeam 5 to the intermediate crossbeam 6 and from this back to the lower crossbeam 4.

A guide rail 15 is mounted on each of the side members 8 of the frame 3 and each guide rail is extending along a curve with the concave side facing upwards.

The guide rails 15 are placed above the borders of the upper chain part 13, which thereby is forced to follow the same curve as the guide rails.

At the area at the lower crossbeam 4 is the upper chain part 13 mainly horizontally oriented while it at the area at the upper crossbeam 5 is mainly vertical oriented.

A tension pulley 16, which may be loaded by a spring (not shown), serves for adjusting the tension of the chain.

The chain is, during operation, sliding along the downwards-turning surface of the guide rails and upon the surface of the crossbeams. The guide rails and crossbeams therefore are made of a material with low frictional resistance.

A chain sprocket 17 is meshing each side of the chain. The sprockets are mounted on an axle 18, which rotatable is journal in bearings 19 formed in the sides of the cabinet.

A driving gear 20, which is meshing a driven gear 21, is mounted on an end part of the axle 18. The driving gear 20 is mounted on an output shaft 22 of an electrical motor 23.

The chain thus can be rotated round the three crossbeams 4, 5 and 6 by energizing the motor 23. By simply reversing the direction of rotation of the motor can the motion of the upper part of the chain optionally be directed either against the upper crossbeam 5 or against the lower crossbeam 4.

The cabinet 1 is constructed of a double walled element 24 at each side of the frame, a double walled element 25 at the rear side of the frame, a bottom wall 26 below the frame and a top wall 27 above the frame.

Each of the side elements 24 is formed with a front part 28, which at the front crossbeam 7 has the same shape as this, seen in section, and horizontally is placed in line with this into the transversal direction of the cabinet.

Each of the side elements 24 is mounted with a rail 29 for supporting the frame 3 which may be placed in such a way on the rails that it can be removed for being renovated or cleaned if necessary.

The top wall 27 of the cabinet is formed with an access opening forming an angle with a horizontal plane for thereby providing a comfortable access to the interior of the cabinet.

The size of this angle may be chosen to be mainly of the same size which a plane through the centreline of the lower and upper crossbeams 4 and 5 forms with a horizontal plane.

A double walled cover 31 serves for closing the opening 30. In FIG. 1 is the cabinet open and in FIG. 2 closed.

The cover is pivotally connected to the cabinet by means of one or more hinges 32 and may be pivoted manually or by means of power-driven actuators, (not shown) or pneumatic or hydraulic working cylinders, (not shown).

A lamp base 33 for mounting one or more quartz lamps 34 is attached to the inner side of the cover 31 in such way that they in the closed position of the cover is placed centrally above the upper part 13 of the chain 2.

At the top of the cabinet is formed an air outlet 35 turning to the rear for allowing air passing the closed cabinet during the heat-treating process to escape from the cabinet. The air outlet may be debouching into the environment or into a filter (not shown) for cleaning the air before being blown out into the environment.

An air exhauster 36 is in this case placed before the air outlet in the cabinet for generating a forced airflow through the cabinet.

The heat-treating of the potato pieces takes place in the following way.

Pivoting the cover 31 upwards opens the access opening 30 to the cabinet 1, after which a portion of potato pieces is laid on the chain grate 2 and pivoting the cover down over the opening closes the access opening 30.

Energizing the motor 23 and the air exhauster 36 and switching on the quartz lamps 34 then is starting the heat-treating process during which the potato pieces are exposed to intensive infrared radiant heat from the quartz lamps.

The now rotating motor 23 brings via the gears 3 and 4 and the chain sprockets 17 the upper chain part 13 to move into the direction of the upper crossbeam 5.

The curved shape of the upper chain part has that advantageous effect that each potato piece will be turned many times while being heat-treated so that an equal heat-treating of the potato pieces optimally is achieved.

Also, the large grate area of the upper chain part secures the heat-treating process to be quickly carried out.

The potato pieces will, even if they are pre-fried, still have some content of water and oleaginous components, which during heating of the potato pieces partly are emitted in form of vapour.

It is necessary continuously to renew the air in the cabinet during operation for avoiding saturation of the air so that the heat-treating process would be more or less hindered or stopped and the potato pieces could not achieve the desired crispy surface owing to lack of oxygen.

The renewing of the air is in this case performed by means of the air exhauster 36, which during operation is generating a flow of air through the cabinet from the opening below the chain 2 to the opening 35 at the top of the cabinet.

A tray, (not shown) can be placed below the chain for receiving fluid as e.g. fat and oil dripping off the heated potato pieces.

The direction of rotation of the motor is reversed when the potato pieces has been heat-treated as required whereby the motion of the upper chain part changes from being directed against the upper crossbeam 5 to be directed against the lower cross beam 4 with the result that the finished potato pieces rapidly are being discharged into e.g. a disposable sleeve 37 for being served as fast food in this if conveniently.

The closure then is opened for repeating the above-mentioned operation if a new portion of heat-treated potato pieces is ordered.

The oven may be placed on e.g. a table 38 in a room (not shown) where the heat-treated potato pieces is served. For hindering that smelly vapour is let out into the room while the cover is in open position can the air exhauster be adapted to operate continuously, that is also when the cabinet is open.

Figure 3:
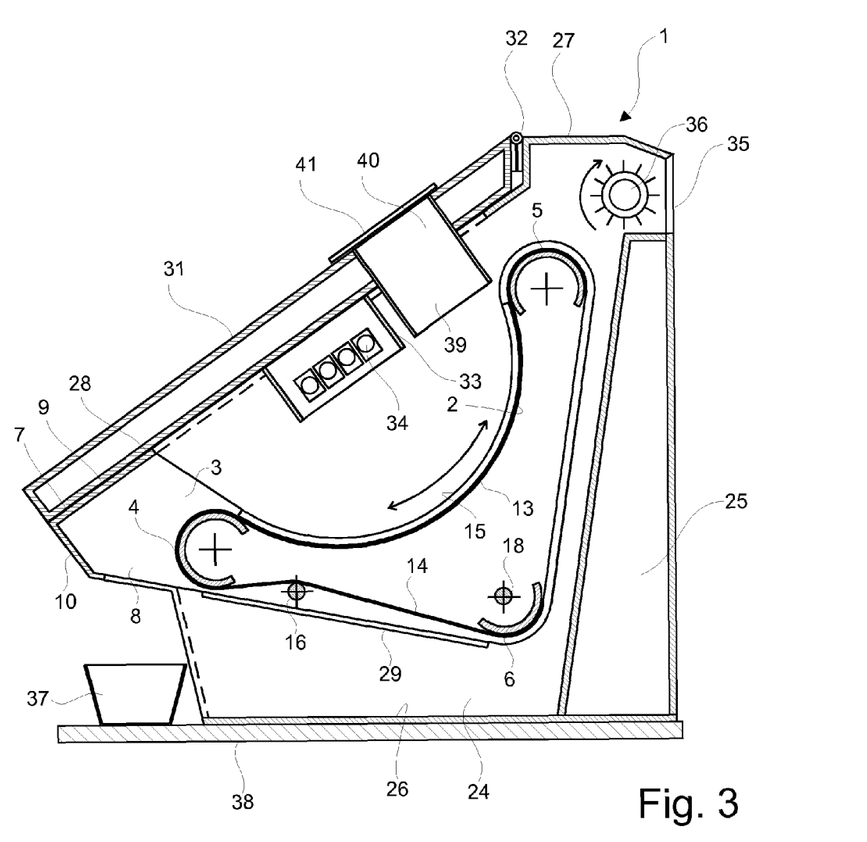
FIG. 3 is a lateral cross section of another embodiment of the oven according to the invention in operative position.

FIG. 3 shows another embodiment of the oven according to the invention in operative position. This embodiment of the oven corresponds in the main to the embodiment shown in FIGS. 1 and 2. Same numerals therefore are used for same parts.

In this case is a funnel 39 with an inlet 40 passed through the cover 31. The inlet is in the figure closed by a slide gate 41, which by being opened is allowing the oven, alternatively to open the cover 31, to be charged through the funnel with a portion of food pieces.

In this case can the cover be releasable attached to the cabinet, so that it is opened or temporarily removed only for inspection and/or cleaning of the chain.

FIGS. 5-8 shows a third embodiment of the oven according to the invention in operative position. This embodiment of the oven corresponds in the main to the embodiment shown in FIG. 3 and same numerals therefore are used for same parts.

A lower, upper and intermediate roller 42, 43 and 44 has in this case replaced the lower, upper and intermediate crossbeam 4, 5 and 6 of the first and second embodiment of the oven of the invention.

Each of these rollers is rotatable mounted in the side members of the frame 3 and the intermediate roller 44 is moreover equipped with, in this case, four chain sprocket 17 meshing the endless chain grate 2.

An electrical motor 45 serves for rotating the intermediate roller during operation in such way the upper chain part 13 is running into the direction of the upper roller 43 while heat treating the potato pieces and into the direction of the lower roller 42 while discharging the heat treated potato pieces.

The function of the oven of the invention corresponds to the function of the previously described function of the first and second embodiment of the oven and this function therefore will not be described further here.

This third embodiment of the invention imply advantage that the chain grate is running round the rollers with a minimum of friction and abrasion.

Figure 5:
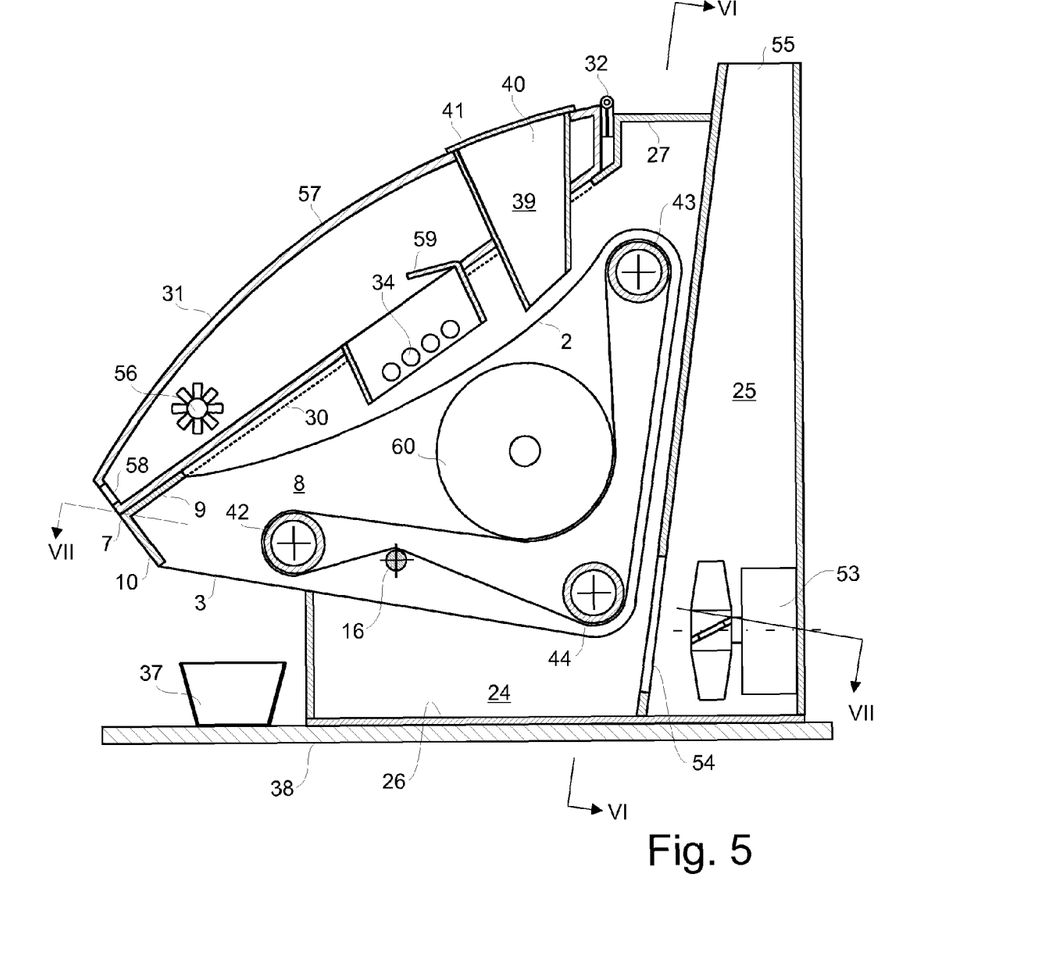
FIG. 5 is a lateral cross-section of a third embodiment of the oven according to the invention in operative position.
Figure 6:
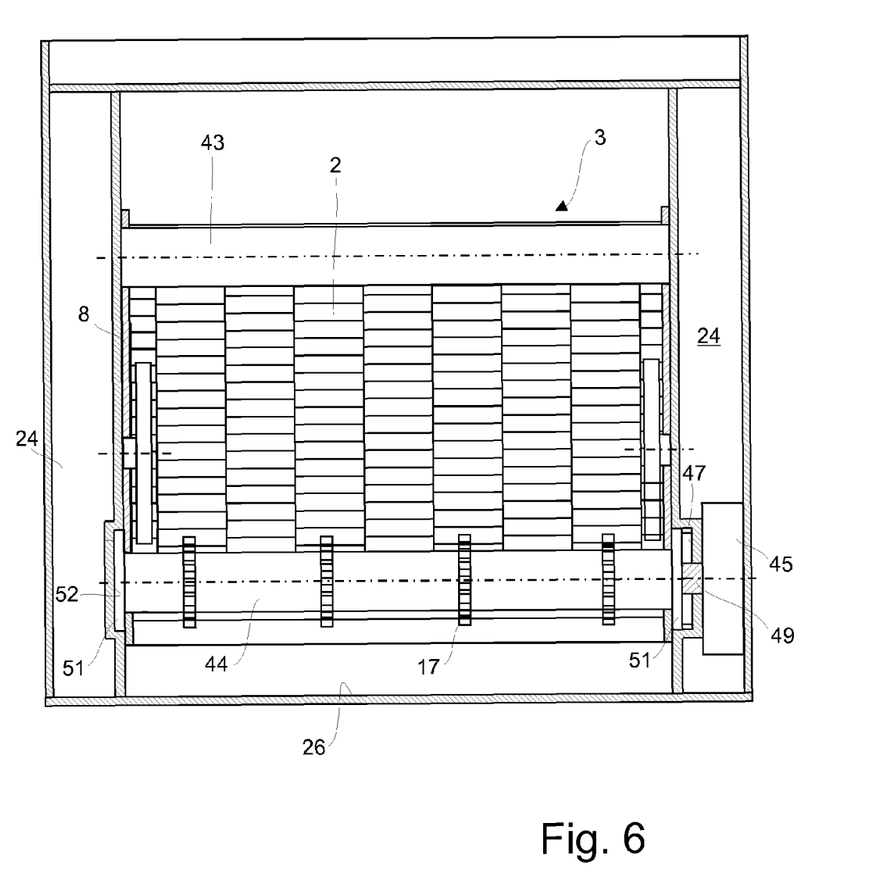
FIG. 6 is a cross-section of the oven taken along the line VI-VI in FIG. 5.
Figures 7, 8:
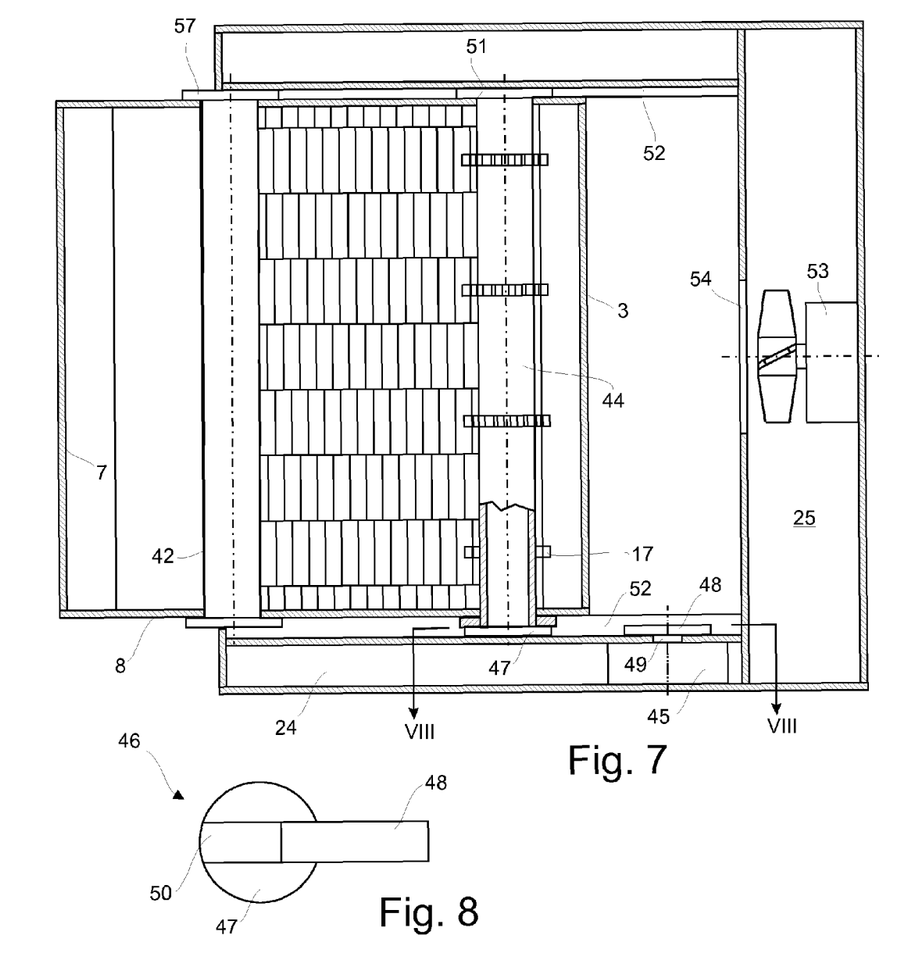
FIG. 7 is a cross-section of the oven taken along the line VII-VII-IV in FIG. 5.
FIG. 8 is a section shown in a larger scale of a clutch of the oven taken along the line VIII-VIII in FIG. 7, but with the two parts of the clutch partly meshing.

In FIGS. 5 and 6 is the oven in its mounted position ready to be used. In FIG. 7 is the frame in process of being pulled out of the oven for being inspected and cleaned.

This operation is possible owing to the specific embodiment of the clutch 46 for releasable connecting the intermediate roller 44 to the electrical motor 45.

This clutch consists of a first part 47 attached to the intermediate roller 44 and a second part 48 attached to the output shaft 49 of the electrical motor 45.

The first part 47 of the clutch 46 is formed with a groove 50 while the second part 48 consists of key 48 fitting into the groove 50.

In mounted state of the oven is the second part 48 of the clutch engaging the groove 50 of the first part 47 whereby the motor is able to transmit motive power to the intermediate roller 44 and via this to the chain grate 2.

When coupling or uncoupling the clutch are the groove and the key placed in the position shown in FIG. 8 where they are in line with the motion direction of the frame being moved in or out of the oven.

At each end of the lower and intermediate roller 42, 44, respectively is placed a wheel 51 for supporting the frame when being moved in or out of the oven. During this operation are the wheels running in grooves 52 formed in the wall elements 24 on each side of the cabinet 1 of the oven.

An exhaust fan 53, which is placed in the double walled element 25 at the rear side of the frame, serves via an opening 54 in said element to renew the air of the cabinet during operation and blow it out of an free opening 55 in top of the element.

The exhaust fan 53 is supported by means of at least one other fan 56 placed in the double walled cover 31, which in this case is formed with convex topside 57.

The at least other fan 56 serves for taking fresh air in via one or more inlet openings 58 in the double walled cover and blow it into the cabinet via the access opening 30 in the top wall of the cabinet for supporting the exhaust fan 53.

Some of said air is by means of a baffle plate 59 guided down on the lamps 34 for effectively cooling the lamps and keeping them free of vaporized substances, which could disintegrate and destroy the lamps.

The slide gate 41 is, when going to prepare a portion of food pieces, at first opened after which the food pieces via the funnel 39 are led into the cabinet and down on the upper chain part 13 of the chain grate 2.

The upper chain part is between the lower and upper roller 42 and 43 extending along a concave curve which in this case is formed by means of two discs 60 which are rotatably mounted in each side member 8 of the frame 3.

Instead of one relatively large disc at each side of the frame may be used two or more smaller discs to form the upper chain part as a curve.

The discs may also be equipped with teeth meshing the upper chain part for thereby effectively securing that the discs rotate instead of only sliding on the chain.

Owing to the fact that the cabinet and the cover are constructed of elements with double walls is the cabinet in itself well isolated. Filling or lining the interior of the elements with an insolating material can improve the isolating.

The oven of the invention has a large capacity and functions very fast even if it has a little space requirement.

What is claimed is:

1. An oven comprising a frame having two side members, and a heat source for heat-treating food pieces placed on a grid in a cabinet, wherein the heat source and the grid are part of the oven, with the grid having an upper part of an endless chain grate running around a number of chain supports of which lower and upper supports define lower and upper ends of the upper chain part; and a driving mechanism for moving the upper chain part in the direction of the upper chain support during heat-treating of a portion of food pieces and in the direction of the lower chain support during discharging of the finished heat-treated food pieces, wherein both the upper and lower chain supports include either rotatable rollers or crossbeams with curved surfaces and a rotatable disc is rotatably mounted in each side member of the frame and is placed between the lower and upper supports in such way that the rotatable disc is leaning against a top side of the upper chain part and wherein a part of the upper chain part extends along a curve which is following a length of arc of the periphery of the rotatable disc, with the upper chain part extending along a concave curve that is formed by the rotatable discs, wherein the concave curve is orientated in such a way that an angle of inclination, which the tangent to said curve at the lower chain support forms with a horizontal plane, is an angle that has a value that is lower than a value of the angle of inclination, which the tangent to said curve at the upper chain support forms with a horizontal plane.

2. The oven according to claim 1, wherein the cabinet comprises an access opening and a cover for at least covering the access opening during heat-treating of the food pieces, and wherein the frame is releasably mounted in the cabinet.

3. The oven according to claim 2, wherein the heat source is mounted on the cover and is facing the upper chain part in the closed position of the cover.

4. The oven according to claim 3, further comprising an air exhauster for generating a flow of air through the cabinet at least during a heat-treating operation.

5. The oven according to claim 1, wherein at least one of the chain supports is a rotatable roller.

6. The oven according to claim 1, wherein both the upper and lower chain supports include rotatable rollers and each side member of the frame includes two or more rotatable discs.

7. The oven according to claim 6, wherein a part of the upper chain part extends along a curve which is following a length of arc of the periphery of the rotatable discs.

8. The oven according to claim 1, wherein the frame comprises the chain supports and two side members and the frame is releasably mounted in the cabinet.

9. The oven according to claim 1, wherein the cabinet comprises an access opening and a cover for at least covering the access opening during heat-treating of the food pieces.

10. The oven according to claim 9, wherein the access opening forms an angle with a horizontal plane and the cover is mounted onto the cabinet by at least one hinge.

11. An oven comprising a frame having two side members, and a heat source for heat-treating food pieces placed on a grid in a cabinet, wherein the heat source and the grid are part of the oven, with the grid having an upper part of an endless chain grate running around a number of chain supports of which lower and upper supports define lower and upper ends of the upper chain part; and a driving mechanism for moving the upper chain part in the direction of the upper chain support during heat-treating of a portion of food pieces and in the direction of the lower chain support during discharging of the finished heat-treated food pieces, wherein both the upper and lower chain supports include either rotatable rollers or crossbeams with curved surfaces and a guide rail is mounted on each side member of the frame between the lower and upper supports with each guide rail extending along a curve with the concave side facing upward, where the guide rails are placed above the borders of the upper chain part, which is forced to follow the same concave curve as the guide, wherein the concave curve is orientated in such a way that an angle of inclination, which the tangent to said curve at the lower chain support forms with a horizontal plane, is an angle that has a value that is lower than a value of the angle of inclination, which the tangent to said curve at the upper chain support forms with a horizontal plane.

12. The oven according to claim 11, wherein at least one of the chain supports is a rotatable roller.

13. The oven according to claim 11, wherein the cabinet comprises an access opening and a cover for at least covering the access opening during heat-treating of the food pieces, and wherein the frame is releasably mounted in the cabinet.

14. The oven according to claim 13, wherein the heat source is mounted on the cover and is facing the upper chain part in the closed position of the cover.

15. The oven according to claim 11, further comprising an air exhauster for generating a flow of air through the cabinet at least during a heat-treating operation.

16. The oven according to claim 11, wherein the frame comprises the chain supports and two side members and the frame is releasably mounted in the cabinet.

17. The oven according to claim 11, wherein the cabinet comprises an access opening and a cover for at least covering the access opening during heat-treating of the food pieces.

18. The oven according to claim 17, wherein the access opening forms an angle with a horizontal plane and the cover is mounted onto the cabinet by at least one hinge.

\* \* \* \* \*